US009077544B2

(12) United States Patent
Baker et al.

(10) Patent No.: US 9,077,544 B2
(45) Date of Patent: Jul. 7, 2015

(54) AUTOMATIC PROVISIONING OF AUTHENTICATION CREDENTIALS

(75) Inventors: Steven D. Baker, Beaverton, OR (US); Eric G. Petersen, Aloha, OR (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 1004 days.

(21) Appl. No.: 12/560,304

(22) Filed: Sep. 15, 2009

(65) Prior Publication Data
US 2011/0067092 A1    Mar. 17, 2011

(51) Int. Cl.
| | | |
|---|---|---|
| *G06F 17/00* | (2006.01) | |
| *H04L 9/32* | (2006.01) | |
| *G06F 21/31* | (2013.01) | |
| *H04L 29/06* | (2006.01) | |
| *H04W 12/06* | (2009.01) | |

(52) U.S. Cl.
CPC .............. *H04L 9/3263* (2013.01); *G06F 21/31* (2013.01); *H04L 63/0846* (2013.01); *H04L 63/083* (2013.01); *H04W 12/06* (2013.01); *H04L 2209/80* (2013.01)

(58) Field of Classification Search
CPC ... G06F 21/31; H04L 63/0846; H04L 63/083; H04L 9/3263; H04L 2209/80; H04W 12/12; H04W 12/06
USPC .............. 726/6, 26, 5; 713/156, 171; 709/220
See application file for complete search history.

(56) References Cited

U.S. PATENT DOCUMENTS

| | | |
|---|---|---|
| 6,223,577 B1 | 5/2001 | Ujc et al. |
| 6,553,493 B1 | 4/2003 | Okumura et al. |
| 6,564,320 B1 | 5/2003 | de Silva et al. |
| 6,584,565 B1 | 6/2003 | Zamek |

(Continued)

FOREIGN PATENT DOCUMENTS

| | | |
|---|---|---|
| WO | WO 2004/070995 A2 | 8/2004 |
| WO | WO 2005/101279 A2 | 10/2005 |

OTHER PUBLICATIONS

NPL "Logging in without a password—certificates & ssh" (Feb. 4, 2009; confirmed at least Apr. 20, 2009) jayfresh et al.; 3 pages; converted to PDF from http://jaybyjayfresh.com/2009/02/04/logging-in-without-a-password-certificates-ssh/ via http://www.archive.org/.*

(Continued)

*Primary Examiner* — Mohammad A Siddiqi
(74) *Attorney, Agent, or Firm* — Merchant & Gould P.C.

(57) ABSTRACT

Methods and systems of automatically provisioning authentication credentials on a plurality of network devices. The method may include determining a process for provisioning the authentication credentials for the plurality of devices. The process may include steps of gaining access to a network device, entering a command to reach a network service interface associated to the network device, indicating a location of the authentication credentials, and initiating installation of the authentication credentials. The method may also include providing a computer program to follow the process. The computer program may be a script that is automatically executed without a user intervention. The method may further include developing a list of the plurality of devices that need to be provisioned, associating the list of the plurality of devices to the computer program, executing the computer program for each device, and outputting whether each of the plurality of network devices has a successful authentication credential update.

8 Claims, 5 Drawing Sheets

(56) References Cited

U.S. PATENT DOCUMENTS

| | | | |
|---|---|---|---|
| 6,854,056 | B1 | 2/2005 | Benantar et al. |
| 7,254,711 | B2 | 8/2007 | Shigematsu et al. |
| 7,421,484 | B2* | 9/2008 | Das ............................... 709/220 |
| 2003/0181798 | A1* | 9/2003 | Al-Ali ........................... 600/324 |
| 2004/0098581 | A1 | 5/2004 | Balfanz et al. |
| 2005/0076239 | A1* | 4/2005 | Locke et al. .................. 713/201 |
| 2005/0081028 | A1* | 4/2005 | Thornton et al. ............. 713/156 |
| 2005/0108057 | A1 | 5/2005 | Cohen et al. |
| 2005/0283198 | A1 | 12/2005 | Haubrich et al. |
| 2006/0206389 | A1 | 9/2006 | Elssner et al. |
| 2006/0282662 | A1* | 12/2006 | Whitcomb .................... 713/156 |
| 2007/0135855 | A1 | 6/2007 | Foshee et al. |
| 2007/0135866 | A1* | 6/2007 | Baker et al. ..................... 607/60 |
| 2007/0214357 | A1 | 9/2007 | Baldus et al. |
| 2007/0249286 | A1 | 10/2007 | Ma et al. |
| 2008/0004904 | A1 | 1/2008 | Tran |
| 2008/0059239 | A1 | 3/2008 | Gerst et al. |
| 2008/0241002 | A1* | 10/2008 | Weber et al. ................... 422/109 |
| 2009/0158032 | A1* | 6/2009 | Costa et al. .................... 713/156 |
| 2009/0320108 | A1* | 12/2009 | Livingston et al. ............... 726/6 |
| 2010/0325687 | A1* | 12/2010 | Iverson et al. ..................... 726/1 |

OTHER PUBLICATIONS

May, Shin, Gunter and Lee, Securing the Drop-Box Architecture for Assisted Living, in Formal Methods in Software Engineering, Alexandria, VA, Nov. 2006, ACM.

Baker and Hoglund, Medical-Grade, Mission-Critical Wireless Networks, IEEE Engineering in Medicine and Biology Magazine, Mar./Apr. 2008, pp. 86-95.

* cited by examiner

```
import urllib2
import ClientForm

#Device variables
#the url of the device
theurl = '172.29.34.64'
protocol = 'http://'
username = 'admin'
password = 'webpassword1234'       ← 404

#Open the page and authenticate
passman =
urllib2.HTTPPasswordMgrWithDefault
Realm()
passman.add_password(None, theurl,
username, password)
authhandler =
urllib2.HTTPBasicAuthHandler(passm
an)
opener =
urllib2.build_opener(authhandler)
urllib2.install_opener(opener)
```

400 ↗
402 ↗
A →

```
############################
###### UPLOAD CERTIFICATE ###########
############################
try:
    #open the page
    response = urllib2.urlopen(protocol +
theurl + '/custCertChain')
except urllib2.HTTPError:
    print 'please close another console'
    quit()
#find form on the page
forms = ClientForm.ParseResponse(response,
backwards_compat=False)
response.close()
form = forms[0]

#upload a file (certificate)
form.add_file(open('eap.py'))

request2 = form.click()    # urllib2.Request
object
try:
    response2 = urllib2.urlopen(request2)
except urllib2.HTTPError, response2:
    pass
response2.close()
```

AUTOMATIC PROVISIONING OF AUTHENTICATION CREDENTIALS

BACKGROUND

IEEE 802.1x authentication is currently a standard solution for hospital information technology departments. Typically, each network device must be manually provisioned with authentication credentials. For example, in order to use 802.1x authentication hospitals and institutes need to manually install certificates on hundreds of infusion pumps. These certificates may have a lifetime of 12 months, so the effort must be repeated each year. Adding in thousands of other devices, one may see the substantial effort required to manually update the authentication credentials on each device.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments described herein relate to methods and systems of automatically provisioning authentication credentials on a plurality of network devices.

As discussed herein, an aspect of some embodiments relates to a method of automatically provisioning authentication credentials on a plurality of network devices. The method includes determining a process for provisioning the authentication credentials for the plurality of network devices, providing a computer program to follow the process, and applying the computer program to automatically provision the authentication credentials for the plurality of network devices.

Another aspect of some embodiments relates to a computer-readable storage medium containing computer executable instructions which when executed by a computer perform a method of automatically provisioning authentication credentials on a plurality of network devices, comprising: determining a process for provisioning the authentication credentials for the plurality of network devices; providing a computer program to follow the process; and applying the computer program to automatically provision the authentication credentials for the plurality of network devices.

Further aspects relate to a method of automatically provisioning authentication credentials on a plurality of network devices. The method includes determining a process for provisioning the authentication credentials for the plurality of devices. The process includes steps of gaining access to a network device, entering a command to reach a network service interface associated to the network device, indicating a location of the authentication credentials, and initiating installation of the authentication credentials. The method also includes providing a computer program to follow the process. The computer program is a script that is automatically executed without user intervention. The method further includes developing a list of the plurality of devices that need to be provisioned, associating the list of the plurality of devices to the computer program, executing the computer program for each device, and outputting whether each of the plurality of network devices has a successful authentication credential update.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 4 shows an example script portion of uploading a certificate file.

DETAILED DESCRIPTION

As briefly described above, embodiments of the present invention are directed to automatically provisioning authentication credentials on a plurality of network devices. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
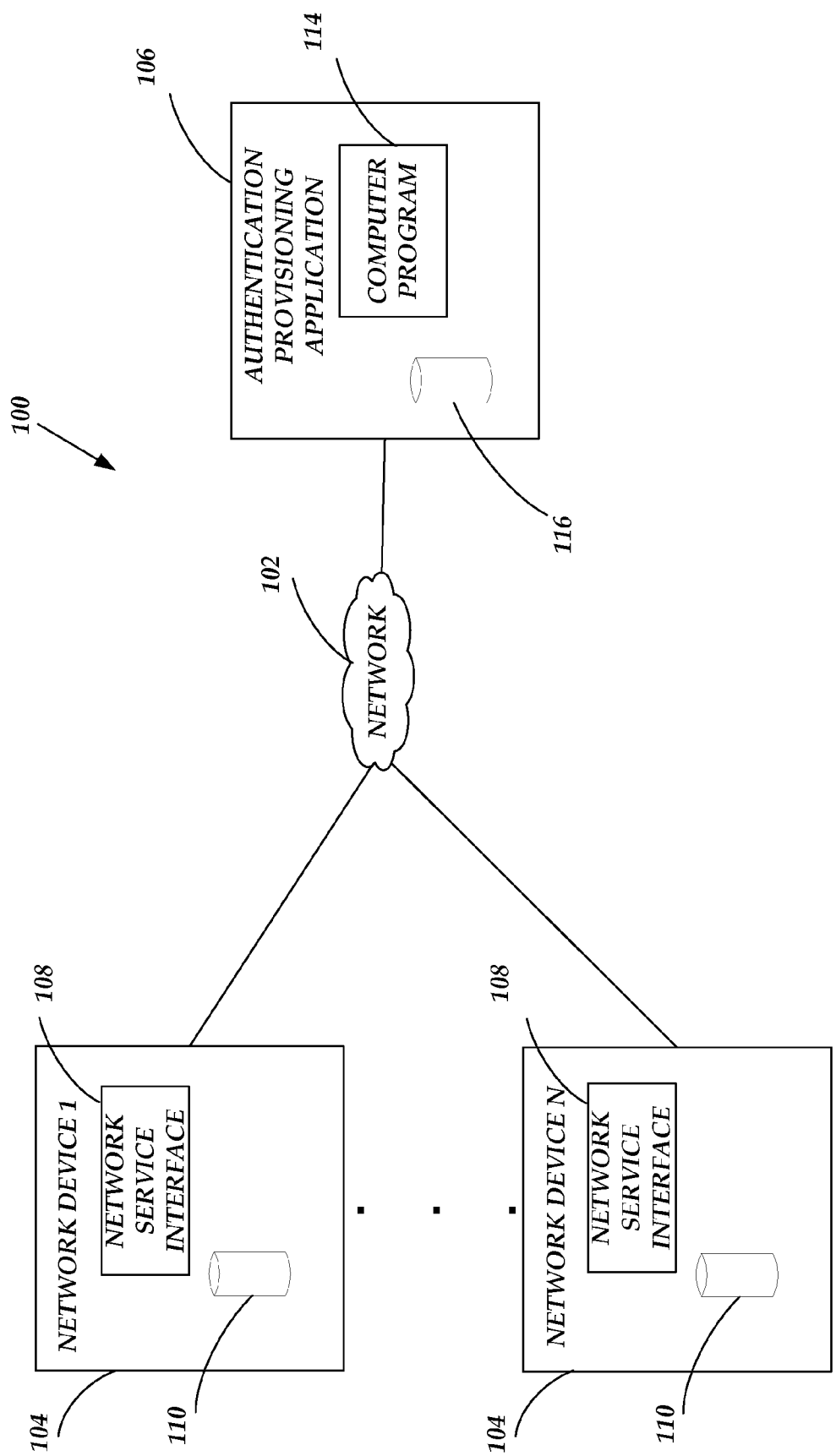
FIG. 1 is a simplified illustration of a network system in which embodiments of the invention may be implemented.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cellular and personal communication service (PCS) telephones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

FIG. 1 is a simplified illustration of a network system 100 in which embodiments of the invention may be implemented. Generally, the network system 100 may include a plurality of network devices 104 and an authentication provisioning application 106. The network devices 104 and the authentication provisioning application 106 may have a network connection 102 such as through a local network, the Internet, or any other suitable network connection. The network devices 104 may be wireless devices such as a Wi-Fi enabled device which may connect to the Internet when within range of a wireless network connected to the Internet. The network devices 104 may also be wired to connect to a network. Examples of the network devices 104 may include infusion pumps, vital signs devices, patient monitors, personal computers, personal digital assistants, telephones, servers, laptops, bridges and the like.

In one example embodiment, the network is the Internet in which embodiments of the invention may be implemented; however the invention applies to any network on which a network device 104 requires authentication credentials. The specific examples are not intended to be taken in a limiting sense and the scope of the present invention is defined by the appended claims and their equivalents.

In one example embodiment, the network devices 104 may use the IEEE 802.1x standard for network access control. The IEEE 802.1x standard may provide an authentication mechanism to the network devices 104 wishing to attach to a network, either establishing a point-to-point connection or preventing it if authentication fails. The IEEE 802.1x standard may be used for wireless 802.11 access points and may be used to implement Extensible Authentication Protocol.

Each network device 104 may need authentication credentials to access the network infrastructure as well as services on the network. The network devices 104 may need to be provisioned with the authentication credentials when the existing credentials are approaching an expiration date, when the devices are being configured for a different purpose or area of the institution, or when altering the state of an existing service or capability. Generally, provisioning is a process of preparing and equipping a network device so that it can provide services to other systems on the network and to the end users.

Referring still to FIG. 1, the network devices 104 may receive and store authentication credentials. According to one embodiment, each network device 104 may include a network service interface 108 which may be configured to receive authentication credentials. The network service interface 108 may be a software system designed to support interoperable machine-to-machine interaction over a network. One example of the network service interface 108 is an Internet application programming interface that can be accessed over a network, such as the Internet, and executed on a remote system hosting the requested services such as the network devices 104. According to one embodiment, the network service interface 108 may support a user interface to receive and install the authentication credentials to the network device 104. The network service interface 108 may have a user interface such as a web server application to interact with a user. In another embodiment, the network service interface 108 may not necessarily have a user interface, instead, the network service interface 108 may be an application programming interface (API) configured to directly receive and install the authentication credentials.

Each network device 104 may also include a storage means 110, such as a database to store the authentication credentials. The storage means 110 may also store other information or data relating to the network device 104, including the status of the most recent authentication update.

Referring still to FIG. 1, the network system 100 may include the authentication provisioning application 106 which may be configured to automatically provision the authentication credentials for the network devices 104. The authentication provisioning application 106 may communicate with the network devices 104 using internet protocols such as HTTP, HTTPS, SNMP, Telnet, SSH or any other suitable Internet protocols. The authentication provisioning application 106 may include a computer program 114 to be executed to provision the authentication credentials for the network devices 104. According to one embodiment, the computer program 114 may be developed in a Python programming script or any other suitable computer languages. The computer program 114 may be configured to run in the authentication provisioning application 106 and allow the authentication provisioning application 106 to access and navigate the network service interface 108 of the network devices 104. This will allow the provisioning application 106 to provision the authentication credentials remotely. Specifically, the computer program 114 may follow and automatically execute pre-determined provisioning process or steps for each network devices 104. The computer program 114 thus may be executed without a user intervention, for example by running as a Terminate and Stay Resident (TSR) program or as a cron job. In one example, a TSR may be a computer system call in DOS computer operating systems that returns control to the system as if the program has quit, but keeps the program in memory. In another example, a cron job may be a time-based job (e.g., a command or shell script) in Unix-like computer operating systems which is scheduled to run automatically at a certain time or date.

The network devices 104 may be different types or classes of devices. Different types or classes of devices may have different pre-determined provisioning process and interface for each type. The authentication provisioning application 106 may identify different types of the network devices 104 and automatically apply each associated pre-determined provisioning process for each different type of the network devices 104. The network service interface 108 may be different for each different type of devices. The authentication provisioning application 106 may be able to identify and navigate each different network service interface 108. According to one embodiment, the authentication provisioning application 106 may recognize the device type by checking a universally unique identifier (UUID) such as a media access control address (MAC address) that is associated with that network device 104.

Referring still to FIG. 1, the authentication provisioning application 106 may have a database 116 that may store information about mapping each specific class of network devices to a particular script or sub-routine of the computer program 114. The computer program 114 may execute and automatically apply each associated provisioning process to each specific type of the network devices 104. According to one embodiment, the particular script or sub-routine of the computer program 114 may be developed and provided to replicate keystrokes needed to provision a device in that class, or scripts may be created manually, then executed multiple times by the authentication provisioning application 106.

Once this is done, any device in that class can be provisioned by creating a list of devices, connecting to each of those devices and running the script appropriate for that device. In addition, the database 116 may retain information of registered devices for future reference.

The authentication credentials may be installed and updated remotely through the authentication provisioning application 106. Using the infusion pumps as an example, there may be hundreds of infusion pumps in various locations of several hospitals. Each infusion pump may be configured to have a network connection 102 and to receive and store an authentication certificate. The authentication credentials thus may be updated remotely through the authentication provisioning application 106 without taking the devices out of service.

The authentication provisioning application 106 may develop a list of network devices 104 that need to be provisioned. The list may be from a database, user entry, or it may look up the network devices 104 based on a filter of information derived from a network appliance such as a wireless controller (not shown), for example, an Aruba 3200 or a Cisco 4402. The filter may operate on any data on data that may be used to derive the device type, manufacturer, or user including a MAC address, devices associated to a certain access point, and devices with certificates about to expire. A TSR or cron job could scan for new devices of a known type and then alert the administrator and/or install the credentials if the network is known to be secure, as in a stand-alone network in an IT lab. Using HTTP, HTTPS, SNMP, Telnet, SSH or other suitable interne protocols as appropriate for the target device 104, the authentication provisioning application 106 may be configured to connect to each network device 104 and perform authentication provisioning for each device 104 in the list. In one example embodiment, the authentication provisioning application 106 may provision authentication credentials on multiple types of devices that are extensible to include different authentication credentials. For example, the authentication provisioning application 106 may install different 802.1x certificates on each device 104. The authentication provisioning application 106 may also install a Pre-Shared Key (PSK) on each device 104. The authentication provisioning application 106 may extract distinguished features or identify from the network service interface 108, e.g., text or graphics, on an opening web page.

After the authentication credentials are installed, the authentication provisioning application 106 may output and indicate whether each network device 104 has a successful authentication credential update or not. The authentication provisioning application 106 may update the database 116 as well.

Figure 2:
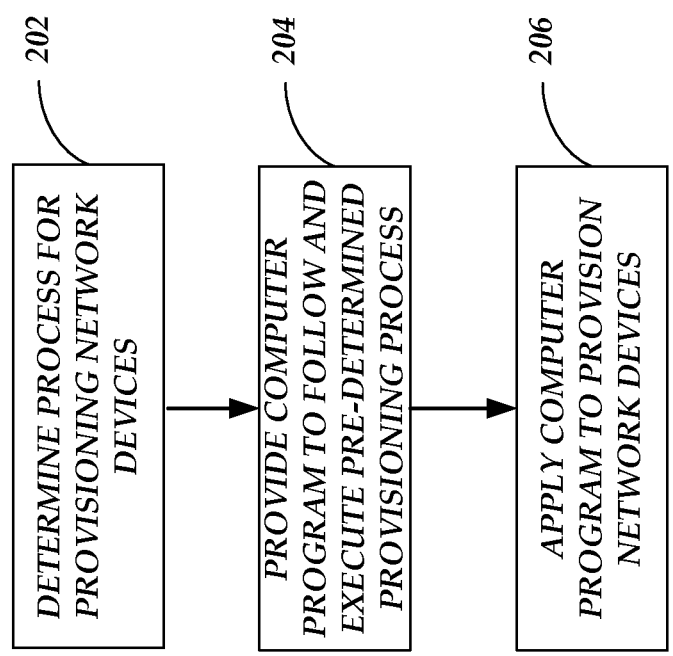
FIG. 2 shows an example method of provisioning authentication credentials on a plurality of network devices.

FIG. 2 illustrates an example method of provisioning authentication credentials on a plurality of network devices. At operation 202, a user may first determine a provisioning process or steps for each network device. The provisioning process or steps for each network device may be preferably completed by a device manufacturer and provided to the end user. As discussed above, different types or classes or even software revisions of devices may have different provisioning process for each type.

Next at operation 204, a computer program such as a script may be developed to follow the provisioning process or steps of each network device. For example, these steps may include: entering a username and password, navigating to an authentication page, entering the pathname and filename for the certificate, and pressing the upload button.

Finally at operation 206, the computer program may be applied to and automatically executed to provision the authentication credentials for the network devices without a user intervention.

Figure 3:
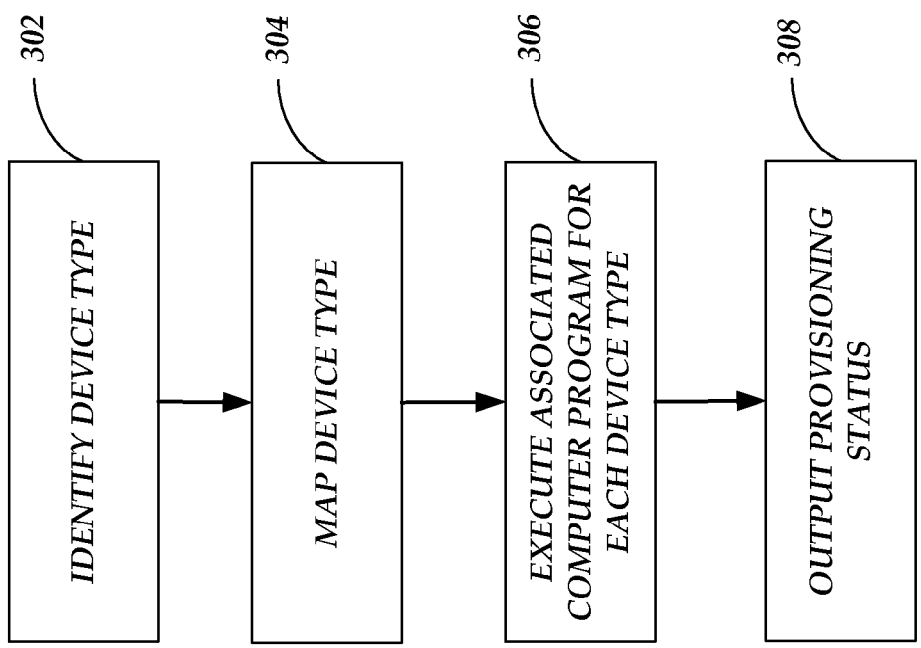
FIG. 3 shows an example method of provisioning authentication credentials for different types or classes of network devices.

FIG. 3 illustrates an example method of provisioning authentication credentials for different types or classes of network devices. At operation 302, different types or classes of the network devices may be identified. For example, the device types or classes may be identified by checking the vendor portion of a MAC address. Other ways for identifying the devices classes are possible, such as scanning the identified devices or the entire network for service ports using a variety of industry standard tools such as "Nmap" (Network Mapper), "Xprobe2", and other port scanning applications. These tools are capable of categorizing network devices with a fine level of differentiation based on both the services that they expose and the operating systems running on those devices. This information may be used to group these network devices into one of several classes for provisioning.

Then at operation 304, each specific class of network devices may be mapped to a particular script or sub-routine of the computer program. Any device in that class may then be provisioned by running the particular script or sub-routine appropriate for that device.

Next at operation 306, the particular script or sub-routine may be executed for each specific class of network devices. Finally at operation 308, the authentication provisioning application may output and indicate whether each network device has a successful authentication credential update or not. This output may include updating the database status for each device to indicate which devices have been successfully updated, which devices failed to update, and which devices are missing or inaccessible. This information may be used in turn to provide a periodic update or report to network administrators so that they know which devices require manual intervention or service.

FIG. 4 illustrates an example script portion 400 of uploading a certificate file. Portion 402 includes defining device variables including the URL of the device, a protocol type, a user name, and a password. Then portion 404 opens a web page and authenticates to gain access to the device. Note that these authentication credentials and IP address may be hard coded, or preferably are determined automatically by network query (the wireless controller can provide the mapping between IP address and MAC address) or by lookup in a user-generated list, which could be located in database 116. Portion 406 illustrates uploading a file such as a certificate. As should be appreciated, the information illustrated in the script portion 400 is for purposes of example only and is not limiting of scripts which are developed for the invention.

Figure 5:
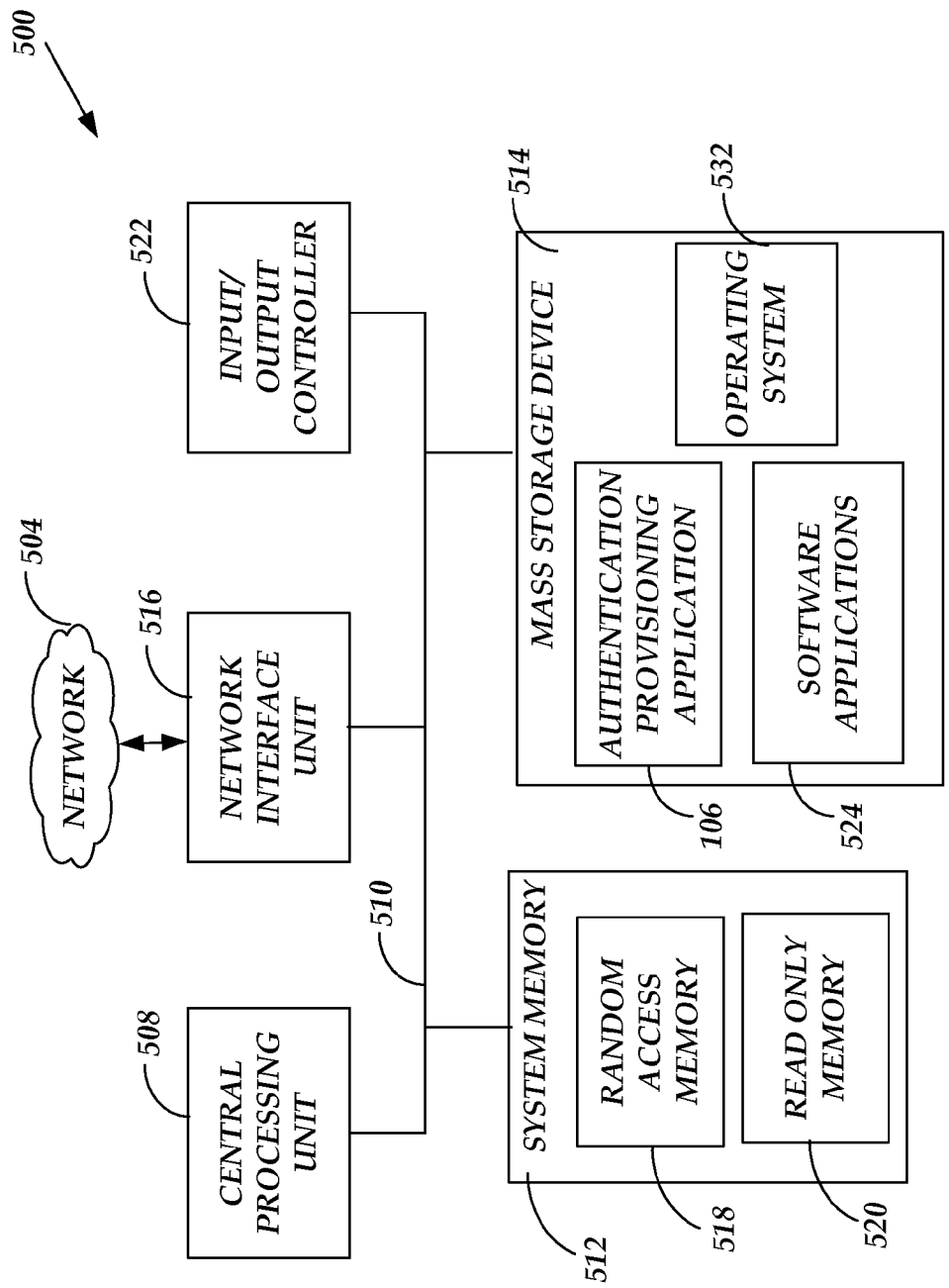
FIG. 5 is a simplified block diagram of an example computing operating environment in which embodiments of the present invention may be practiced.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Referring to FIG. 5, an illustrative operating environment for embodiments of the invention will be described. As shown in FIG. 5, computer 500 comprises a general purpose desktop, laptop, handheld, mobile or other type of computer (computing device) capable of executing one or more application programs. The computer 500 includes at least one central processing unit 508 ("CPU"), a system memory 512, including a random access memory 518 ("RAM") and a read-only memory ("ROM") 520, and a system bus 510 that couples the memory to the CPU 508. A basic input/output system containing the basic routines that help to transfer information between elements within the computer, such as during startup, is stored in the ROM 520. The computer 500 further includes a mass storage device 514 for storing an operating system 532, application programs, and other program modules.

The mass storage device 514 is connected to the CPU 508 through a mass storage controller (not shown) connected to the bus 510. The mass storage device 514 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed or utilized by the computer 500.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic tape, magnetic disk storage or other magnetic storage devices, or any other medium which can be used to store the desired information and which can be accessed by the computer 500.

According to various embodiments of the invention, the computer 500 may operate in a networked environment using logical connections to remote network devices through a network 504, such as a local network, the Internet, etc. for example. According to embodiments of the present invention, examples of the remote network devices may be wireless infusion pumps, vital signs devices, patient monitors, personal computers, personal digital assistants, telephones, servers, laptops, bridges and the like, as discussed above.

The computer 500 may connect to the network 504 through a network interface unit 516 connected to the bus 510. It should be appreciated that the network interface unit 516 may also be utilized to connect to other types of networks and remote computing systems. The computer 500 may also include an input/output controller 522 for receiving and processing input from a number of other devices, including a keyboard, mouse, etc. (not shown). Similarly, an input/output controller 522 may provide output to a display screen, a printer, or other type of output device.

As mentioned briefly above, a number of program modules and data files may be stored in the mass storage device 514 and system memory 512 of the computer 500, including an operating system 532 suitable for controlling the operation of a networked personal computer. The mass storage device 514 and RAM 518 may also store one or more program modules. In particular, the mass storage device 514 and the RAM 518 may store application programs, such as a software application 524. According to embodiments of the present invention, the mass storage device 514 and the RAM 518 may also store the authentication provisioning application 106. The mass storage device 514 may also store the database 116 that may store the mapping of each specific class of network device and may store the status of each of the devices that have been identified to be provisioned.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of automatically provisioning authentication credentials on a plurality of network devices, comprising:
    automatically obtaining a list of network devices that need to be provisioned with authentication credentials allowing the network devices to attach to a network, one or more of the network devices being medical devices configured to measure physiological data associated with a patient,
    wherein one or more of the authentication credentials are authentication certificates or pre-shared keys;
    identifying one or more classes of network devices from the list of network devices that need to be provisioned with authentication credentials;
    mapping each identified class of network device to a script or subroutine of a computer program; and
    executing the script or subroutine for each mapped class of network device to automatically provision the authentication credentials for the plurality of network devices to allow the network devices to attach to and access resources on the network,
    wherein each network device that is provisioned for an identified class of network devices is provisioned by executing a same script or subroutine that is mapped to the identified class of network device, and
    wherein the script or subroutine for a network device of the identified class of network devices includes:
        automating authentication to access the network device by performing a query involving a mapping of an Internet Protocol address to a Media Access Control address; and
        uploading at least one of the authentication certificates to the network device upon authentication.

2. The method of claim 1, wherein the computer program is automatically executed without user intervention.

3. The method of claim 1, further comprising steps of:
    gaining access to a network device;
    entering a command to reach a network service interface associated to the network device;
    indicating a location of the authentication credentials; and
    initiating installation of the authentication credentials.

4. The method of claim 1, wherein applying the computer program includes:
   associating the plurality of network devices to the computer program through a database or data file; and
   executing the computer program for each device.

5. The method of claim 1, further comprising outputting to a display, report, database, or data file whether the plurality of network devices have a successful authentication credential update or not.

6. The method of claim 1, wherein the plurality of network devices include multiple different types of network devices.

7. The method of claim 6, wherein provisioning authentication credentials includes provisioning authentication credentials on the multiple different types of network devices having different authentication credentials.

8. The method of claim 1, wherein the plurality of network devices are wireless network devices.

* * * * *